(12) United States Patent
Huettner et al.

(10) Patent No.: US 9,718,619 B2
(45) Date of Patent: Aug. 1, 2017

(54) CHAIN CONVEYOR FOR PLASTICS MATERIAL PRE-FORMS

(71) Applicant: KRONES AG, Neutraubling (DE)

(72) Inventors: Johann Huettner, Mallersdorf-Pfaffenberg (DE); Martin Seger, Neumarkt i. d. Opf. (DE)

(73) Assignee: KRONES AG (DE)

(*) Notice: Subject to any disclaimer, the term of this patent is extended or adjusted under 35 U.S.C. 154(b) by 0 days.

(21) Appl. No.: 14/390,739

(22) PCT Filed: Apr. 10, 2013

(86) PCT No.: PCT/EP2013/057466
§ 371 (c)(1),
(2) Date: Oct. 3, 2014

(87) PCT Pub. No.: WO2013/153100
PCT Pub. Date: Oct. 17, 2013

(65) Prior Publication Data
US 2015/0090565 A1 Apr. 2, 2015

(30) Foreign Application Priority Data
Apr. 10, 2012 (DE) .................. 10 2012 103 078

(51) Int. Cl.
*B65G 17/08* (2006.01)
*B65G 17/40* (2006.01)
(Continued)

(52) U.S. Cl.
CPC .............. *B65G 17/08* (2013.01); *B29C 59/16* (2013.01); *B29C 71/04* (2013.01); *B65G 17/40* (2013.01);
(Continued)

(58) Field of Classification Search
None
See application file for complete search history.

(56) References Cited

U.S. PATENT DOCUMENTS 2,866,538 A * 12/1958 Goldberg ............... B65G 21/02
198/840
4,987,028 A * 1/1991 Kandachi .............. C03C 14/002
428/312.2
(Continued)

FOREIGN PATENT DOCUMENTS

CN 1250740 4/2000 ............. B65G 17/08
CN 1360618 7/2002 ............. C09D 5/00
(Continued)

OTHER PUBLICATIONS

International Search Report (no translation) issued in corresponding application No. PCT/EP2013/057466, dated Aug. 12, 2013 (8 pgs).
(Continued)

*Primary Examiner* — Kavel Singh
(74) *Attorney, Agent, or Firm* — Hayes Soloway P.C.

(57) ABSTRACT

An apparatus for the conveying of containers, with a conveyor which forms a contact face for the containers to be conveyed, wherein the conveyor moves at least locally along a pre-set direction and has a plurality of conveying members connected to one another in an articulated manner, and with a drive device for driving the conveyor. The conveying members are produced from a plastics material which has been acted upon with a radiation in order to change its material structure and/or which has a plurality of spherical bodies embedded in its material structure.

22 Claims, 2 Drawing Sheets

(51) Int. Cl.
  *B65G 15/38* (2006.01)
  *B29C 71/04* (2006.01)
  *B29C 59/16* (2006.01)
  *B29C 35/08* (2006.01)

(52) U.S. Cl.
  CPC ... *B29C 2035/085* (2013.01); *B29C 2035/0877* (2013.01)

(56) References Cited

U.S. PATENT DOCUMENTS

| | | | | |
|---|---|---|---|---|
| 6,050,397 A * | 4/2000 | Kato | ... | B65G 17/08 198/851 |
| 6,250,458 B1 * | 6/2001 | Shibayama | ... | B65G 17/086 198/851 |
| 6,485,794 B1 * | 11/2002 | Li | ... | B65D 23/0828 427/372.2 |
| 6,672,585 B2 * | 1/2004 | Nishida | ... | B65H 29/32 271/211 |
| 7,314,132 B2 * | 1/2008 | Layne | ... | B65G 17/40 198/850 |
| 7,419,052 B2 | 9/2008 | Ozaki et al. | ... | 198/853 |
| 7,824,742 B2 | 11/2010 | Von Gellhorn et al. | ... | 427/569 |
| 8,057,903 B2 | 11/2011 | Asthana et al. | ... | 428/423.7 |
| 8,573,390 B2 * | 11/2013 | Andrews | ... | B23K 26/0838 198/844.1 |
| 8,613,354 B2 | 12/2013 | Seger et al. | ... | 198/836.1 |
| 2003/0085105 A1 | 5/2003 | Sawa et al. | ... | 198/847 |
| 2004/0022950 A1 * | 2/2004 | Jung | ... | C09D 5/002 427/385.5 |
| 2010/0292374 A1 | 11/2010 | Bellare | ... | 524/110 |
| 2013/0221761 A1 * | 8/2013 | DePaso | ... | B65G 17/08 307/151 |

FOREIGN PATENT DOCUMENTS

| | | | |
|---|---|---|---|
| CN | 102390698 | 3/2012 | ... B65G 47/24 |
| DE | 100 26 298 | 11/2001 | ... B65G 17/08 |
| DE | 10027229 | 12/2001 | ... B65G 17/08 |
| DE | 102009003552 | 9/2010 | ... B65G 15/08 |
| DE | 102010017724 | 1/2012 | ... B65G 21/20 |
| EP | 0987200 | 3/2000 | ... B65G 17/24 |
| EP | 1705198 | 9/2006 | ... B65G 17/08 |
| EP | 2007660 | 12/2008 | ... B05D 1/06 |
| JP | 2010132429 | 6/2010 | ... B65G 17/38 |
| WO | WO96/41759 | 12/1996 | ... B65G 21/22 |
| WO | WO2005/049227 | 6/2005 | ... B05D 7/24 |
| WO | WO2006/030167 | 3/2006 | ... B65G 17/08 |

OTHER PUBLICATIONS

German Search Report (no translation) issued in related application No. 10 2012 103 078.2, dated Oct. 24, 2012 (6 pgs).
First Office Action issued in corresponding Chinese Patent Application Serial No. 201380015825.4 dated Dec. 4, 2015, with English translation (4 pgs).
European Official Action issued in corresponding EP Patent Application Serial No. 13 715 680.8-1708, dated May 19, 2016 (5 pgs).

* cited by examiner

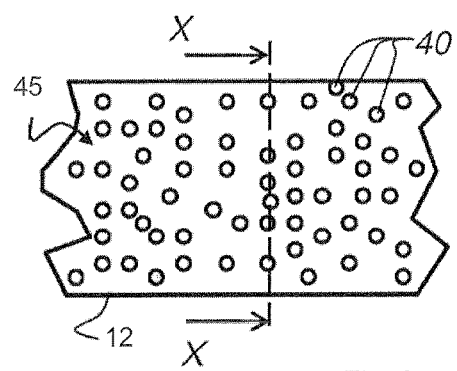 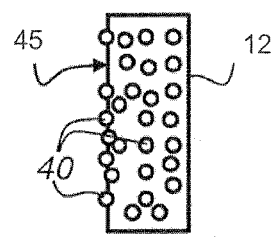
Fig. 3a  Fig. 3b
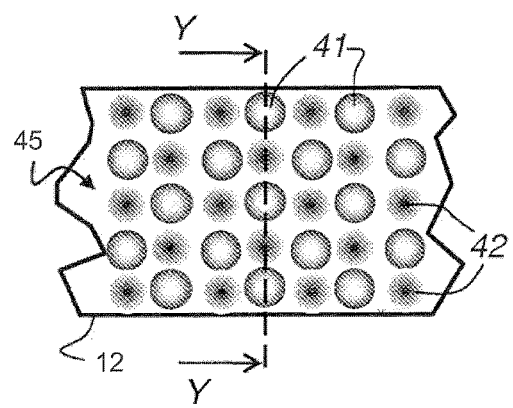 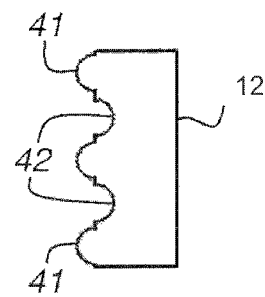
Fig. 4a  Fig. 4b

CHAIN CONVEYOR FOR PLASTICS MATERIAL PRE-FORMS

BACKGROUND OF THE INVENTION

The present invention relates to an apparatus for the conveying of containers, and in particular plastics material containers. Apparatus of this type have long been known from the prior art. In this way, it is known for example for containers, such as for example plastic bottles, to be conveyed on plastics material belts or even plastics material chains. Plastics material chains of this type are usually produced from polyamide (PA) or polyoxymethylene (POM). In order to reduce the friction a lubricant is usually applied to the surface of the chain or the conveyor belt.

Since conveyor systems in dry running have been required to an increasing extent in recent years, however, problems concerning an increased coefficient of friction between the containers and the plastics material flat-top chains or flush-grid chains respectively arise to an ever greater degree. Tests without belt lubricants and other materials, such as for example metal, PA and POM, have broken down inter alia at the coefficient of friction of the materials for the PET containers. In particular, in recent years increasingly lighter plastics material pre-forms have been used in order to reduce weight and, on the other hand, an increasing amount of recycled material is also used for the production of plastics material containers. This choice of material, however, also leads to the plastics material containers also having an increased tendency to stick.

In this case both sticking of the plastics material containers to one another and sticking of the plastics material containers to the conveyor belt or the conveying chain respectively can occur.

A conveying chain, which has a plurality of connecting elements which are connected to one another by pins, is known from EP 0 987 200 A2. In this case these connecting elements are produced from a synthetic resin material.

EP 1 705 198 A1 likewise describes a conveying chain with a plurality of connecting members, these connecting members being connected to a plate and this plate having a synthetic resin material and at least one antistatic element with a high molecular weight.

In the prior art it is usually necessary for use to be made of additional consumable materials which have to be additionally washed off again for cleaning purposes in conjunction with water or which continuously encumber the waste water disposal in the case of wet lubrication.

The object of the present invention is therefore to make available a conveying device which has a lower friction with the containers to be conveyed.

SUMMARY OF THE INVENTION

An apparatus according to the invention for the conveying of containers has a circulating conveyor belt which forms a contact face for the containers to be conveyed. In this case this conveying means moves at least locally along a pre-set and, in particular, a straight direction and has a plurality of conveying members connected to one another in an articulated manner and, in addition, a drive device for driving the conveying means.

According to the invention the conveying members are produced from a plastics material which has been acted upon with a radiation in order to change its material structure and/or which has a plurality of bodies—in particular spherical—embedded in its material structure.

Two possibilities are therefore proposed in this case for improving conveying devices of this type. In the alternative first described the conveying members or chain links respectively are subjected (during their production) to rays, and in particular to gamma or beta rays. As a result of this treatment the molecule chains of the conveying members are also cross-linked in the interior of the material in a homogenous manner. In this way, the friction can be reduced. At the same time the temperature resistance is also increased and the wear which occurs can thus be substantially prevented. Despite the irradiation a satisfactory sliding property of the profiles or the conveying members respectively can be retained.

It is preferable for the conveying members or the plastics material of the conveying members respectively to be irradiated with rays which have a (quantum) energy of more than 100 keV, preferably of more than 150 keV. In this case it is possible for a plastics material first to be irradiated and then for the individual conveying members to be produced from this irradiated plastics material. It would also be possible, however, for the conveying members to be produced first and then to be irradiated (at least locally). It is advantageous for the conveying members to be substantially rigid or to be conveying members designed so as to be inflexible respectively.

It is advantageous for the plastics material to be penetrated by the radiation. It is particularly preferred for the plastics material to be a homogeneous material which is preferably built up in the same way on the outside as on the inside.

It is advantageous for the conveying device to convey the containers to at least one treatment device for the treatment of the containers (for example a filling device for the filling of the containers, a labelling device or a closing means) or from at least one treatment device for the treatment of the containers.

The treatment of the plastics material pre-forms can be a treatment which is selected from a group of treatments which includes the blow moulding of plastics material pre-forms into containers, the heating of plastics material containers, the cooling of plastics material containers, the sterilization of plastics material containers, the cleaning of plastics material containers, the filling of plastics material containers, the closing of plastics material containers, the labelling of plastics material containers and/or the conveying of plastics material containers or the like.

The Applicants have found that plastics materials treated with radiation in this way, in particular plastics materials cross-linked by radiation, have a substantially improved characteristic, in particular with respect to frictional characteristics. An irradiation of plastics materials in this way has already been known for a long time. Originally a suitable insulation material for cables was sought. It was discovered in this case that an irradiation of certain plastics materials by radiation induces a cross-linking of the plastics material and, in addition, also a degradation of polymers. A cross-linking was originally understood as being a reaction in which a plurality of individual macromolecules are linked to form a three-dimensional network. In this case the characteristics of the material are altered. The aim is to impart a greater degree of hardness or even temperature resistance to polymer materials for example in this case.

In the case of a further advantageous embodiment the plastics material is selected from a group which includes polyethylene (PE), polyether/ether ketones (PEEK), polyoxymethylene (POM), and in particular [ultra]-high-molecular-weight polyethylene (UHMW-PE), PP (polypropylene), PA (polyamide)—in particular PA46, PA6, PA6.6, PA11 or PA12—, PBT (polybutyl ether phthalate), PMP (polymethylpentene) and the like. In addition, combinations of these materials can also be used. The aforesaid plastics materials are in part examples of plastics materials capable of being cross-linked by radiation in this case.

In the case of a further advantageous embodiment a further component is added to the plastics material in order to promote the cross-linking. It is advantageous for this further component to be added in a resin. It is advantageous for this further component to be a cross-linking booster. It is preferable in this case for the plastics materials PA or PBT to be capable of being cross-linked.

The degree of cross-linking (also referred to as the proportion of gel) can be used in order to show the cross-linking. This proportion of gel is determined in accordance with DIN 16892/120 by boiling for several hours in a suitable solvent (for example formic acid). In this case it is determined gravimetrically how great the mass of the cross-linked material is in relation to the total mass. In the same way, a soldering iron test according to the PTS specification is usual for practical rapid tests. It is advantageous for the proportion of gel or the degree of cross-linking respectively to be over 10%, preferably over 30% and in a particularly preferred manner over 50%.

It is advantageous for the plastics material, in particular the plastics material cross-linked by radiation, to have added to it at least one further component, and in particular a further material. It is advantageous for the addition of this further material to result in an improvement of the sliding characteristics of the guide device. In the case of a further advantageous embodiment the further component is a carbon-based component, and in particular graphite. It would also be possible, however, for other components such as oils or paraffins to be added.

The plastics materials described here are characterized also by an improved friction resistance and tensile loading. These characteristics can be improved still further if glass fibres or carbon fibres are added to the plastics material.

In addition, it is also possible for the plastics material to be formed from multiple components, and in particular from two components. In this way, it is possible for the plastics material to have a cross-linked core and, as a further sliding component for the containers or slide rails respectively, a further plastics material could be injected around, for example under a chain. Furthermore, it would also be possible for different materials to be provided for example for the top side and the underside of the plastics material body.

Within the scope of the production it would be possible in this case first to produce the chain links with a two-component injection-moulding machine and then to cross-link them. With a suitable choice of the plastics materials the core could be capable of being cross-linked for example and, in contrast thereto, the surfaces could not be cross-linked or could even be inert or could also additionally improve their tribological characteristics.

Plastics material containers are also to be understood as being, in addition to the actual main bodies such as for example bottles, the accessories thereof such as, in particular, the closures thereof. The invention is therefore likewise capable of being applied to a conveying device for the conveying of container closures, such as for example channels or conveyor chains for container closures, in or on which the closures can be conveyed or even conveying plates for container closures. In addition, the invention is capable of being applied to packages of a plurality of containers or even to apparatus which convey for example crates of beverages.

In general, therefore, the invention is capable of being applied to conveying devices for the conveying of bulk material.

It is advantageous for a precisely determined amount of energy to be introduced into the plastics material during the radiation treatment, in which case for example use can be made of electron accelerators of different power (for beta rays) or even a cobalt-60 source (for gamma rays).

The Applicants have established that this action of ionizing radiation is also harmless for the treatment of foodstuffs, since no radioactivity is produced by ionizing radiation in plastics materials themselves.

The plastics material containers are, in particular, PET containers. It is preferable for the radiation treatment of the plastics materials to be, in particular, a cross-linking by gamma and/or beta rays. It is therefore advantageous for at least the guide face of the conveying members towards the containers to have a plastics material treated by radiation. In the case of a further advantageous embodiment the conveying members are formed from at least two components.

An essential difference between these two types of radiation lies in the penetration capacity and the dose rate. In plants with electron accelerators, the operation is carried out with high dose rates, but with a limited depth of penetration dependent upon the energy. Even relatively large components can be "penetrated" with electrons by the accelerator plants with high electron energy which in the meantime have become available.

Gamma rays, on the other hand, have a high penetration capacity with a relatively low dose rate. In terms of the application this means that in the electron accelerators the dose is applied within a period of seconds to the material to be radiated, whereas several hours are required for this in a gamma plant.

In particular, in the case of moulded parts of compact design, such as for example conveying members, gamma rays can in turn have a major advantage. It is advantageous for electron beams to be used in the irradiation of the material.

In the case of an advantageous embodiment at least the surface of the conveying members towards the containers has a plastics material treated by the action of gamma and/or beta radiation. This means that it is not absolutely necessary to irradiate the entire conveying member, but in all events essentially that surface which subsequently comes into contact with the plastics material container.

It is preferable for the above-mentioned guide face towards the containers to have a material cross-linked by the aforesaid radiation.

In the case of electron irradiation during the penetration of a polymer these electrons are braked and they impart kinetic energy to the material by way of a cascade of secondary electrons. After that, the macromolecules break up statistically into radicals which cause the cross-linking with further macromolecules. In this way for example, plastics material polyethylene (PE), polyoxymethylene (POM) or polyamide (PA) can be directly converted into substances with improved, heat deformation resistance at relatively high temperatures of use. In addition, however, it has also been possible to establish that the abrasion resistance increases, and this is important in particular within the scope of the present statement of objects.

Within the scope of the production process it is possible for the plastics material parts irradiated in this way to be further processed immediately after the irradiation thereof.

It is preferable for a plastics material already reinforced by other materials also to be used for example a plastics material which has already been mixed with glass fibres or functional additives. The cross-linking by radiation is independent of reinforcement means of this type.

In the case of the second alternative a plurality of additional bodies, in particular of substantially spherical bodies such as for example glass microspheres, are incorporated at least locally into the material of the guide device. In this way, the mechanical strength is increased and the coefficient of friction is also sharply reduced. It would also be possible for the two variants described here to be used cumulatively or jointly.

In this way, it is possible for the surface structure of the material to be formed by a plurality of spherical elements or to have one such element, the elements being embedded in a base material and/or carrier material of the guide device or a guide insert. It is advantageous in this case for these elements, in particular spherical elements, to be produced from a material which is selected from a group of materials which includes glass or ceramic spheres and the like, preferably unipolar fillers.

In this case it is advantageous for these additional bodies, for example spherical bodies, to have in each case cross-sections or volumes respectively which have a diameter of less than 1 mm, preferably less than 0.1 mm, and in a particularly preferred manner less than 0.01 mm.

It is advantageous for a proportion by weight of these spherical bodies with respect to the total material to amount to more than 5%, preferably to more than 10%, and in a particularly preferred manner to more than 20%.

Instead of spherical bodies it would also be possible for substantially spherical bodies, for example ellipse-like bodies, to be provided.

It is advantageous for the conveying members to form a support face which supports an area of the containers, and in particular a base area of the containers. The apparatus is thus an active conveying means, i.e. it moves the containers in an active manner and not for example by the containers sliding along.

In the case of a further advantageous embodiment the conveying members are produced at least locally from a material which is selected from a group of materials which includes polyethylene (PE), polyether/ether ketones (PEEK), polyoxymethylene (POM), polyamide (PA), and in particular [ultra]-high-molecular-weight polyethylene (UHMW-PE). In addition, combinations of these materials can also be used.

In the case of a further advantageous embodiment the apparatus is a conveying device capable of being operated without lubricant or in dry running respectively. In particular, therefore, no lubrication of the surface of the conveying members carrying the containers takes place. It is also advantageous for no lubrication of the circulating conveying means with respect to the drive thereof to take place. In addition, the connections between the individual conveying members are also advantageously not lubricated.

In the case of a further advantageous embodiment the apparatus conveys the containers to a filling plant for filling the containers or away from a filling plant for filling the containers. In addition, it would also be possible for a plurality of apparatus of this type to be provided which both convey containers to a filling plant and convey (in particular filled) containers away from a filling plant.

In the case of a further advantageous embodiment the conveying members are connected to one another by means of connecting bodies and these connecting bodies consist of a material which is formed from a group of materials which are advantageously more wear-resistant than the conveying members. These are preferably either a curable stainless steel or polyamide rods in the case of plastics material chains. It is thus advantageous for these connecting bodies too, which can be for example connecting pins, to be formed from a special plastics material composition which likewise reduces the frictional losses.

In the case of a further advantageous embodiment the apparatus has at least two reversing rollers which are arranged at the ends and around which the conveying members are reversed. It is also advantageous in this case for these reversing rollers at the ends to be produced from a plastics material. In addition, further rollers, such as in particular tensioning rollers, can also be provided.

In the case of a further advantageous embodiment the conveying means is arranged below the containers to be conveyed. In this way, the containers are advantageously conveyed standing upright on the conveying means. It is advantageous in this case for the conveying means to be a conveying chain. The conveying means could also, however, be used for the lateral conveying of the containers (for example by the co-operation of two opposed chains, between which the containers are guided) or a contact face for the containers could extend in the vertical direction.

In addition, it is preferable for lateral guide elements to be provided which prevent the containers from falling off from the conveying means. In this case it is advantageously possible for the containers which are to be conveyed to be advanced in one track. A two-track or multiple-track conveying of the containers would also, however, be possible.

In the case of a further advantageous embodiment the plastics material has a pre-set proportion of gel. It advantageous for this proportion of gel to be over 10%, preferably over 30% and in a particularly preferred manner over 50%.

The present invention further relates to a conveying means for the conveying of plastics material containers, in particular for an apparatus of the type described above. In this case the conveying means has a plurality of conveying members connected to one another, in which case the conveying means can be designed in the form of a closed chain and these conveying members are connected to one another in an articulated manner by way of connecting bodies. In this case the conveying members have a plastics material in each case.

According to the invention the plastics material has been acted upon with radiation in order to alter its material structure and/or it has a plurality of bodies, in particular spherical bodies, embedded in its material structure. In general, the bodies embedded in the material can also have a different spatial shape or they can be formed in the manner of granulates respectively. It is preferable, however, for these (spherical) bodies to have a higher degree of hardness than the plastics material into which they are incorporated.

In this way, it is also proposed for the conveying means that a material acted upon with radiation or a material with embedded bodies (in particular spherical) should be provided at least locally as the material for the conveying members. It is advantageous for the spherical bodies to have a higher degree of hardness than the plastics material.

In the case of an advantageous embodiment the conveying members have in each case one plate-like portion acting as a support face for the containers. At least this portion and, in particular, the face which contacts the containers is treated in the manner according to the invention in this case.

It is advantageous for the conveying members to have at least two articulation points which are arranged at a distance from each other in a direction at a right angle to the conveying direction and by way of which they are connected to one another in an articulated manner.

In the case of a further advantageous embodiment the conveying members are formed in one piece. It would also be possible, however, for the conveying members to have a base body of a conventional material which is provided with a coating of a material according to the invention. In this way, a base body of the conveying members could be produced from a carbon material and a layer of the material according to the invention could be arranged on this base body.

The present invention further relates to the use of a plastics material, the structure of which has been altered by means of rays, and/or of a plastics material provided with a plurality of spherical bodies for a conveying chain for the conveying of plastics material containers.

The rays are, in particular, beta or gamma rays. It is advantageous for at least the surface of the conveying members, on which the containers stand, to have been acted upon with these rays.

BRIEF DESCRIPTION OF THE DRAWINGS

Further advantages and embodiments are evident from the accompanying drawings. In the drawings

FIGS. 3a, 3b are two illustrations of a plastics material, and

FIGS. 4a, 4b are two further illustrations of a plastics material.

DETAILED DESCRIPTION OF THE INVENTION

Figure 1:
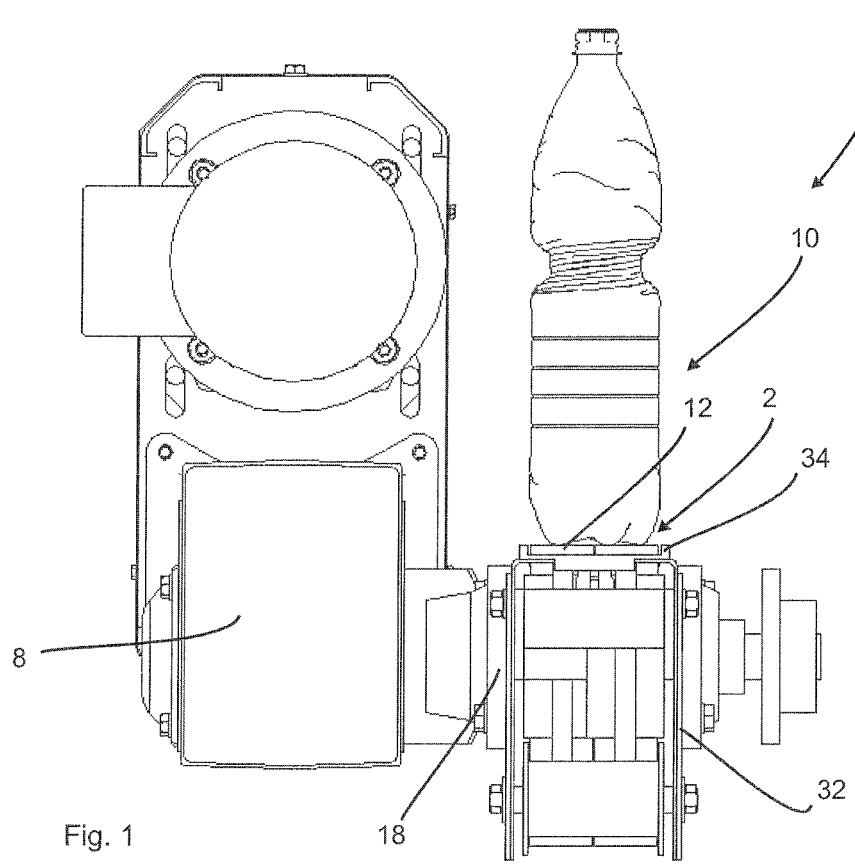
FIG. 1 is a diagrammatic illustration of an apparatus according to the invention for the conveying of containers.

FIG. 1 is a diagrammatic illustration of a conveying device 1 according to the invention for the conveying of containers 10. In this case the reference number 2 designates diagrammatically a conveying means which is designed in this case in the form of a circulating conveying chain. This conveying means 2 is guided laterally in this case through a guide device 34. This guide device 34 can also be produced from the plastics material according to the invention in this case. The reference number 32 designates a carrier on which the conveying means 2 is arranged, and the reference number 18 designates a reversing roller (illustrated only in part) for reversing the conveying means.

The reference number 8 designates a drive for the conveying device, such as in particular an electric motor. The container 10 is conveyed standing on the conveying means in this case. The containers 10 can be both filled containers and empty containers. The container in this case is, in particular, a PET container.

Figure 2:
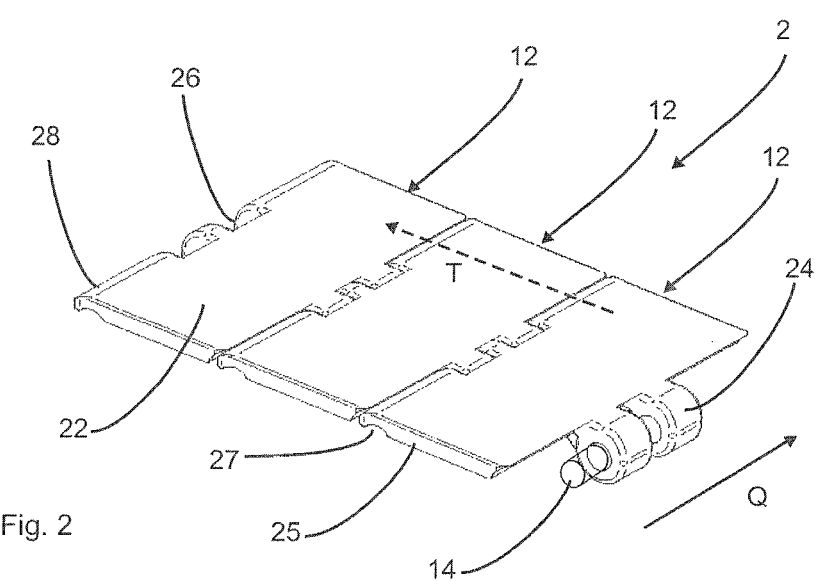
FIG. 2 is an illustration of three conveying members arranged one upon the other.

FIG. 2 is a diagrammatic illustration of three conveying members 12. These conveying members 12 are connected to one another in an articulated manner in this case. For this purpose, an articulation element 24 is arranged on each conveying member. These conveying members 12 are connected to one another by way of connecting pins 14. The reference number 26 refers to recesses into which the respective articulation elements 24 designed in the form of projections can enter. In this way, an articulated connection is produced at two points in a direction Q extending transversely to the conveying direction T. It is advantageous for the connecting pin 14 to be removable, so that individual conveying members 12 can be replaced in the event of repairs for example.

The reference number 28 relates to a curved end portion of the individual connecting member, which has the effect that an unduly large gap is not formed between the individual conveying members 12 even in the event of one connecting member being pivoted with respect to another one.

The reference number 25 designates a lateral wall of the individual connecting members and the reference number 27 a recess. A reversing wheel for example can engage in this recess, so that a smaller radius is possible on the end areas for reversing the conveying means. A support element, which prevents a pronounced bending of the conveying means 2 downwards, can also be provided below the conveying means 2.

FIGS. 3a, 3b show a further design of a material according to the invention for the conveying members 12. In this case a plurality of bodies 40—in this case substantially spherical—are embedded in the base body 45 of the material. FIG. 3b is a view of the body from FIG. 3a along the arrows X-X from FIG. 3a. It is evident that in this case a contact face is formed by these individual spherical bodies 40. The raised portions which are formed by the spherical bodies 40 are shown hemispherical in this case, but the invention is not limited to this. As a whole, however, a hilly guide face is formed in this way and it has been possible to show that this hilly guide face reduces the coefficient of friction of the conveying members or the surfaces thereof respectively.

In general it is preferable for this embedding of the spherical bodies 40 also to be combined with a radiation cross-linking of the plastics material. Furthermore, additional reinforcement elements which reinforce the material of the plastics material as a whole can also be provided.

FIGS. 4a, 4b show a further embodiment in which raised portions 41 and/or depressions 42 are provided in the material 45. In this case these raised portions and depressions can also be provided in the form of uniform furrows or grooves or having a different profiling. As a whole, it is made possible in this way for the resulting guide face of the conveying members 12 to have an abutment area which is smaller as a whole in the contact area with the plastics material containers.

The Applicants reserve the right to claim all the features disclosed in the application documents as being essential to the invention, insofar as they are novel either individually or in combination as compared with the prior art.

LIST OF REFERENCES 1 conveying device
2 conveying means
8 drive
10 containers
12 conveying members
14 connecting pins
18 reversing roller
24 articulation element
25 lateral wall
26 recesses
27 recess 28 curved end portion
32 carrier
34 guide device
40 spherical body
41 raised portion
42 depression
45 material for conveying members
T conveying direction
Q transverse direction

The invention claimed is:

1. An apparatus for the conveying of containers, with a circulating conveyor which forms a contact face for supporting the containers to be conveyed, wherein the conveyor moves at least locally along a pre-set direction and has a plurality of conveying members connected to one another in an articulated manner, and a drive device for driving the conveyor, wherein the conveying members are formed from a plastics material which has a plurality of spherical bodies embedded in its material structure, wherein at least some of said spherical bodies extend from the contact face, resulting in a material structure change selected from the group consisting of a reduced coefficient of friction, an increased wear and an increased temperature resistance.

2. The apparatus according to claim 1, wherein the conveying members are produced from a material selected from the group consisting of PA, PEEK, POM and UHMW-PE.

3. The apparatus according to claim 1, wherein the plastics material is also acted upon by radiation in order to change a material structure selected from the group consisting of a reduced coefficient of friction, an increased wear.

4. The apparatus according to claim 1, wherein the apparatus is an apparatus capable of being operated without lubricant.

5. The apparatus according to claim 1, wherein the apparatus conveys the containers to a filling plant for filling the containers or away from a filling plant for filling the containers.

6. The apparatus according to claim 1, wherein the spherical bodies are produced from a material selected from a group of materials which includes glass or ceramic spheres.

7. The apparatus according to claim 1, wherein the conveying members are connected to one another by connecting bodies and the connecting bodies are formed of a material which is selected from materials which are more wear-resistant than the conveying members.

8. The apparatus according to claim 1, wherein the conveyor is arranged below the containers to be conveyed.

9. The apparatus according to claim 1, wherein the plastics material has a pre-set proportion of gel.

10. The apparatus according to claim 9, wherein the proportion of gel is over 10%.

11. A conveyor for the conveying of plastics material containers for use in the apparatus of claim 1, wherein the conveyor has a plurality of conveying members connected to one another, wherein the conveyor is in the form of a closed chain and wherein these conveying members are connected to one another in an articulated manner by connecting bodies and the conveying members have a plastics material in each case, wherein the plastics material has a plurality of spherical bodies embedded in its material structure.

12. The conveyor according to claim 11, wherein the conveying members have in each case a plate-like portion acting as a support face for the containers.

13. Use of a plastics material mixed with a plurality of spherical bodies, for a conveying chain having a contact face for the conveying of plastics material containers, wherein at least some of said spherical bodies extend from the contact face resulting in a reduced coefficient of friction and increased wear and temperature resistance of said contact face.

14. The apparatus according to claim 7, wherein the connecting bodies are formed of a material selected from stainless steel and polyamide rods in the case of plastics material chains.

15. The apparatus according to claim 10, wherein the proportion of gel is over 30%.

16. The apparatus according to claim 10, wherein the proportion of gel is over 50%.

17. The apparatus according to claim 3, wherein the conveying members or the plastics material forming the conveying members are acted upon with rays which have a quantum energy greater than 100 kEV.

18. The apparatus according to claim 3, wherein the conveying members or the plastics material forming the conveying members are acted upon with rays which have a quantum energy greater than 150 kEV.

19. The apparatus according to claim 3, wherein the conveying members are acted upon with radiation after they are shaped.

20. The apparatus according to claim 1, wherein the conveying members are substantially rigid or inflexible.

21. The apparatus according to claim 1, wherein the plastics material is penetrated by the radiation.

22. The apparatus according to claim 1, wherein the conveyor members are formed of a homogenous plastic material throughout.

* * * * *